US011948593B2

United States Patent
Du et al.

(10) Patent No.: US 11,948,593 B2
(45) Date of Patent: Apr. 2, 2024

(54) METHOD AND APPARATUS FOR REMOVING NOISE FROM SOUND SIGNAL FROM MICROPHONE

(71) Applicant: Robert Bosch GmbH, Stuttgart (DE)

(72) Inventors: Bin Du, Shanghai (CN); Tongtong Jiao, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/845,214

(22) Filed: Jun. 21, 2022

(65) Prior Publication Data

US 2023/0005494 A1 Jan. 5, 2023

(30) Foreign Application Priority Data

Jun. 30, 2021 (CN) .......................... 202110734412.8

(51) Int. Cl.
*G10L 21/0232* (2013.01)
*G01P 1/02* (2006.01)
*G01P 15/00* (2006.01)
*G10L 15/22* (2006.01)
*G10L 21/0216* (2013.01)
*H04R 1/02* (2006.01)
*H04R 1/08* (2006.01)
*H04R 3/00* (2006.01)
*H04R 29/00* (2006.01)

(52) U.S. Cl.
CPC .......... *G10L 21/0232* (2013.01); *G01P 1/023* (2013.01); *G01P 15/00* (2013.01); *G10L 15/22* (2013.01); *H04R 1/025* (2013.01); *H04R 1/08* (2013.01); *H04R 3/00* (2013.01); *H04R 29/001* (2013.01); *G10L 2021/02163* (2013.01)

(58) Field of Classification Search
CPC ................. G10L 21/0232; G10L 15/22; G10L 2021/02163; G01P 1/23; G01P 15/00; H04R 1/025; H04R 1/08; H04R 3/00; H04R 29/001
See application file for complete search history.

(56) References Cited

U.S. PATENT DOCUMENTS 9,992,592 B1 * 6/2018 Alam .................... H04R 29/001
2021/0344181 A1 * 11/2021 Pedoeem ............... H02G 3/081

* cited by examiner

*Primary Examiner* — Andrew L Sniezek
(74) *Attorney, Agent, or Firm* — Maginot, Moore & Beck LLP

(57) ABSTRACT

A method for removing noise from a sound signal received by a microphone is provided. The method includes receiving a vibration signal from a vibration monitoring device mechanically connected to a loudspeaker, the vibration signal indicating vibration caused by a sound emitted by the loudspeaker. The method further includes receiving a sound signal received by the microphone. In addition, the method includes removing the vibration signal from the sound signal so as to remove noise from the sound signal. With the vibration signal from the vibration monitoring device, noise can be removed from the sound signal received by the microphone so as to achieve a satisfactory audio effect or accurate sound recognition.

5 Claims, 4 Drawing Sheets

METHOD AND APPARATUS FOR REMOVING NOISE FROM SOUND SIGNAL FROM MICROPHONE

This application claims priority under 35 U.S.C. § 119 to patent application no. CN 10 202110734412.8, filed on Jun. 30, 2021 in China, the disclosure of which is incorporated herein by reference in its entirety.

The present disclosure relates to media communication and processing, and in particular to sound denoising.

BACKGROUND

In many scenarios, a microphone and a loudspeaker need to work at the same time, for example, when a karaoke device, a smart sound box, or a sound system including a microphone and a loudspeaker in a conference room is used. In some application scenarios, noise from the microphone is amplified and played by the loudspeaker, and then captured by the microphone, which cycles back and forth, making it difficult to get a satisfactory audio effect. Especially in the conference room or a karaoke box, such repeated noise is often unbearable to a user.

In the process of using the smart sound box, when the user issues a voice command while the loudspeaker plays some media content, as a sound signal received by the microphone contains both the sound signal corresponding to the played media content and also a voice command signal of the user, the voice command is often difficult to be accurately recognized, making the smart sound box unable to perform the corresponding operation in time.

At present, a microphone array and a monitoring microphone are arranged, and microphone beamforming and active noise reduction technologies are used to remove noise from the sound signal received by the microphone, such as removing a signal corresponding to a sound emitted by the loudspeaker. However, in such an arrangement, it is difficult to obtain an ideal denoising effect because the monitoring microphone tends to be supersaturated at a high sound volume.

SUMMARY

It is expected to provide an improved technique for removing noise from a signal from a microphone to achieve a satisfactory audio effect or accurate sound recognition. With this technique, it is possible to remove a signal corresponding to a sound emitted by a loudspeaker that is included in the signal from the microphone.

According to one aspect, a method for removing noise from a sound signal received by a microphone is provided. The method includes: receiving a vibration signal from a vibration monitoring device mechanically connected to a loudspeaker, the vibration signal indicating vibration caused by a sound emitted by the loudspeaker; receiving a sound signal received by the microphone; and removing the vibration signal from the sound signal so as to remove noise from the sound signal.

According to another aspect, an apparatus for removing noise from a sound signal received by a microphone is provided. The apparatus includes: a receiving unit, configured to receive a vibration signal from a vibration monitoring device mechanically connected to a loudspeaker, and a sound signal received by the microphone, the vibration signal indicating vibration caused by a sound emitted by the loudspeaker; and a processing unit, configured to remove the vibration signal from the sound signal to remove noise from the sound signal.

According to another aspect, a sound apparatus is provided. The sound apparatus includes: a loudspeaker; a microphone; a vibration monitoring device, mechanically connected to the loudspeaker and being capable of generating a vibration signal indicating vibration caused by a sound emitted by the loudspeaker; and a processor configured to execute the method according to the embodiment of the present disclosure as described above.

According to yet another aspect, a computer program product is provided, which includes computer program instructions which, when run, enable the processor to execute the method according to the embodiments of the present disclosure.

According to the embodiments of various aspects of the present disclosure, vibration caused by a sound emitted by a loudspeaker is monitored using a vibration monitoring device mechanically coupled to the loudspeaker, then a sound signal received by a microphone is processed on the basis of the monitored vibration signal, and in particular, the signal corresponding to the sound emitted by the loudspeaker is removed. This eliminates the need to use a monitoring microphone, solves the problem of supersaturation of the monitoring microphone, and can remove noise at the same time, so as to achieve a satisfactory audio effect or obtain accurate sound recognition.

BRIEF DESCRIPTION OF THE DRAWINGS

In the accompanying drawings, embodiments are described only by way of example rather than limitation. Similar reference numerals in the drawings refer to similar elements.

Figure 1:
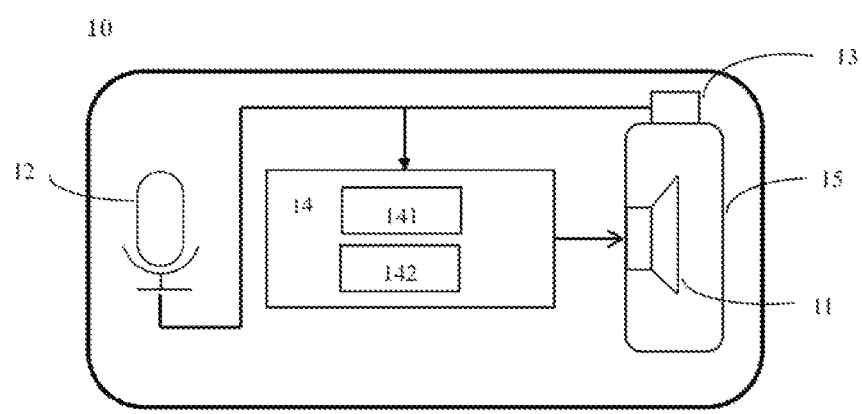
FIG. 1 illustrates an apparatus for sound collection and playback according to an embodiment of the present disclosure.

Various aspects and features of various embodiments of the present disclosure are described with reference to the above drawings. The above drawings are only schematic rather than limiting. Without departing from the essence of the present disclosure, the dimensions, shape, reference numeral, or appearance of each element in the above drawings may be changed. In addition, various parts of the apparatus in the embodiments of the present disclosure are not fully marked with reference numerals in the above drawings. In some drawings, only related components are shown, but this does not limit such various parts to those shown in the drawings of this specification.

DETAILED DESCRIPTION

In many scenarios, a microphone and a loudspeaker need to work at the same time. In such a scenario, when a user uses the microphone while the loudspeaker plays audio content, a signal received by the microphone includes not only a sound signal emitted by the user but also a signal corresponding to a sound emitted by the loudspeaker, that is, the loudspeaker may become an environmental noise source for the microphone. It is expected to remove the signal corresponding to the sound emitted by the loudspeaker from the signal from the microphone, that is, to remove a noise signal, so as to better restore the sound signal emitted by the user for subsequent playback or sound recognition.

According to the embodiments of the present disclosure, vibration caused by a sound emitted by the loudspeaker is monitored using a vibration monitoring device, and then the sound signal received by the microphone is processed on the basis of the monitored vibration signal so as to obtain the sound signal emitted by the user.

Scenarios requiring simultaneous operation of a microphone and a loudspeaker are various, and only two specific applications will be described below, but it may be understood that the scope of protection of the present disclosure is not limited thereto.

FIG. 1 illustrates an apparatus 10 for sound collection and playback according to an embodiment of the present disclosure. The apparatus 10 may be a sound apparatus. Alternatively, the apparatus 10 may be some media devices having sound playback and collection functions, such as a smart television. Specifically, in this embodiment, the apparatus 10 is a smart sound box including a loudspeaker 11, a microphone 12, a vibration monitoring device 13, a processor 14, and an (optional) housing 15.

The loudspeaker 11 is configured to play a predetermined audio content, which may be a sound received by the microphone 12, processed by the processor 14 and then played by the loudspeaker 11, or may be a predetermined audio content, such as music, crosstalk or a story, that is played, for example, by a user-designated smart sound box.

The microphone 12 is configured to receive surrounding sound signals. In the case of a smart sound box, it needs to receive a voice signal from the user. The received voice signal from the user is transmitted to the processor 14 for voice recognition, and when a voice from the user is recognized, the smart sound box may perform the corresponding operation. For example, when the user sends out the voice "What's the weather like today?", the microphone 12 may receive the voice signal, and then the processor 14 recognizes the voice signal, determines that the user is asking about the weather, initiates a weather inquiry operation to inquire about the weather, and sends an inquiry result to the loudspeaker 11, which plays the weather conditions of the day to the user. Sometimes, the user is using a playback function of the smart sound box to play predetermined audio content, such as music, crosstalk or a story, through the loudspeaker.

At this point, he wants to communicate with the smart sound box to inquire about certain contents or use other functions thereof. For example, when the smart sound box is playing crosstalk, the user sends out the voice "Remind me in 20 minutes". At this time, the microphone 12 of the smart sound box receives not only a sound signal from the user but also an audio signal emitted from the loudspeaker 11. This makes it difficult for the processor 14 to recognize the user's voice according to the signal from the microphone. In this case, the user often has to send out a voice signal at a higher volume again, which deteriorates the experience of using the smart sound box.

The smart sound box shown in FIG. 1 further includes a vibration monitoring device 13 arranged on the housing 15 and used for monitoring vibration caused by a sound emitted by the loudspeaker 11. As shown in FIG. 1, the loudspeaker 11 is accommodated in the housing 15. When the audio signal is played through the loudspeaker 11, the sound thus emitted causes the corresponding vibration in the housing 15, and the vibration of the housing 15 is monitored by the vibration monitoring device 13. In this way, the vibration signal from the vibration monitoring device 13 can indicate the vibration caused by the sound emitted by the loudspeaker 11. Although as shown in FIG. 1, the vibration monitoring device 13 is arranged on an outer surface of the housing 15, it is not restrictive, and it may also be arranged on an inner surface of the housing 15. The vibration monitoring device 13 includes an acceleration sensor.

The vibration signal monitored by the vibration monitoring device 13 is transmitted to the processor 14. As described above, the professor 14 also receives a sound signal received by the microphone 12. The processor 14 is capable of processing the sound signal received by the microphone 12 on the basis of the received vibration signal so as to remove noise from the sound signal received by the microphone 12. Specifically, the received vibration signal is removed from the sound signal received by the microphone. In an embodiment, the processor 14 includes a receiving unit 141 and a processing unit 142. The receiving unit 141 receives a vibration signal from the vibration monitoring device 13 and a sound signal from the microphone 12. The processing unit 142 processes the sound signal on the basis of the received vibration signal.

In an embodiment, the processing unit 142 may adjust the amplitude, phase and/or bandwidth of the vibration signal with reference to the amplitude, phase and/or bandwidth of the sound signal from the microphone 12 to convert the vibration signal into the corresponding sound signal. Thereafter, the processing unit 142 removes the adjusted vibration signal from the sound signal received by the microphone 12, i.e., removes the corresponding sound signal obtained after the conversion, so as to obtain the sound signal from the user in the case of the smart sound box. The sound signal from the user may be further subjected to voice recognition processing to initiate the corresponding operation, such as making a timing of 20 minutes.

In an embodiment, the smart sound box may also include a controller (not shown) that controls various operations of the smart sound box. For example, the controller controls the operation of the processor 14 according to the use state of the loudspeaker 11. When the controller determines that the loudspeaker 11 is in use, the receiving unit 141 receives both the vibration signal from the vibration monitoring device 13 and the sound signal from the microphone 12, and the processing unit 142 processes the sound signal from the microphone 12 on the basis of the received vibration signal. Otherwise, when the controller determines that the loudspeaker 11 is not in use, the receiving unit 141 does not receive the vibration signal from the vibration monitoring device 13 but only receives the sound signal from the microphone 12. Therefore, voice recognition can be directly performed on the basis of the sound signal from the microphone.

Figure 2:
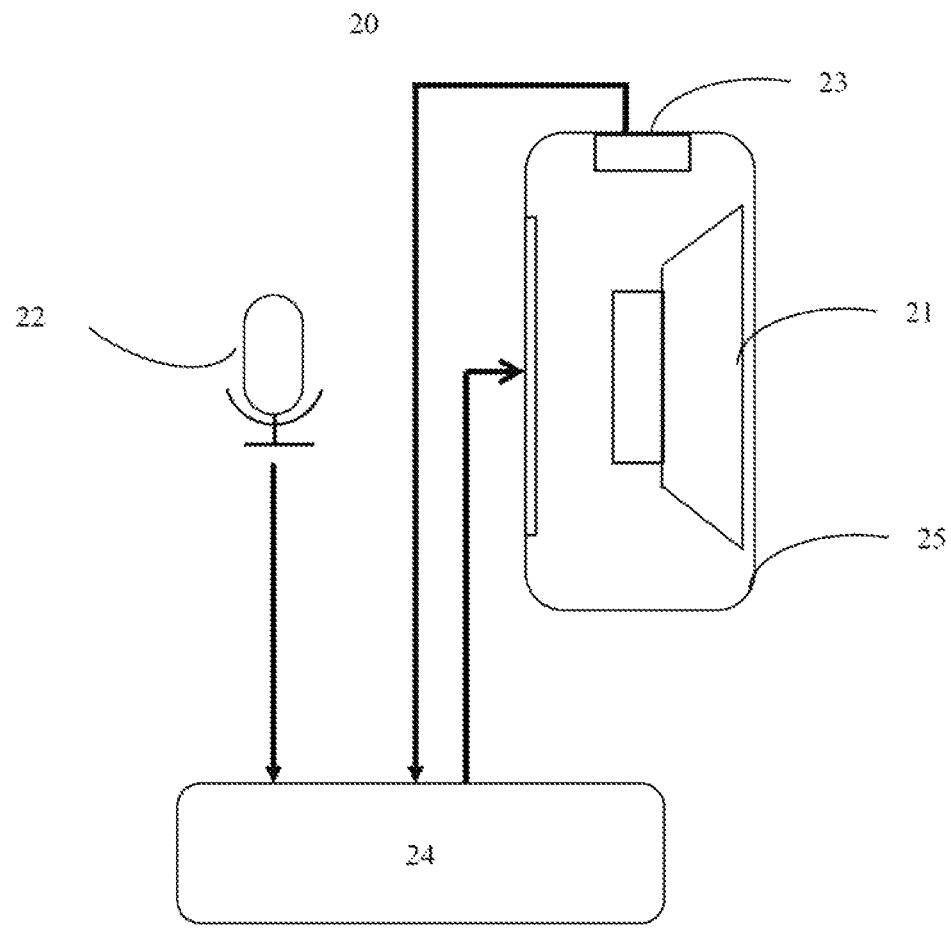
FIG. 2 illustrates an apparatus for sound collection and playback according to another embodiment of the present disclosure.

FIG. 2 illustrates an apparatus 20 for sound collection and playback according to another embodiment of the present disclosure. The apparatus 20, for example, is a conference room sound apparatus including a loudspeaker 21, a microphone 22, a vibration monitoring device 23, a processor 24, and an (optional) housing 25. Similar to the embodiment shown in FIG. 1, the processor 24 may include a receiving unit and a processing unit. It may also be expected that the processor as a whole implements the functions of the receiving unit and the processing unit described above.

Different from the embodiment described above with reference to FIG. 1, in the embodiment shown in FIG. 2, the vibration monitoring device 23 is arranged on an inner surface of the housing 25.

In the process of a conference, the microphone 22 receives sound signals. The received sound signals are processed by the processor 24 and then played by the loudspeaker 21. In this case, a small noise from the microphone is amplified into a large noise, and is played out by the loudspeaker 21, and the microphone 22 further receives the signal from the loudspeaker, which cycles back and forth, making the noise unbearable.

In order to overcome the influence of noise, similarly to the embodiment shown in FIG. 1, in the embodiment shown in FIG. 2, the processor 24 receives a vibration signal from the vibration monitoring device 23 and the sound signal from the microphone 22, and processes the sound signal on the basis of the vibration signal, after which the processed sound signal is amplified and output via the loudspeaker 21. Therefore, the noise is removed and a satisfactory audio effect is obtained.

In FIGS. 1 and 2, similar components are denoted by similar reference numerals and these similar components perform similar functions. Therefore, similar components are not described in detail with reference to FIG. 2.

Although the locations of the vibration monitoring devices 13, 23 are shown only with reference to FIGS. 1 and 2, it may be understood that this is not restrictive. The vibration monitoring device 13, 23 may be arranged at any location in the vicinity of the loudspeaker and is mechanically connected to the loudspeaker. Mechanical connection refers to the physical connection between two components to enable a force transmission between the two components, so as to realize a vibration transmission between them. The connection includes direct connection and indirect connection. The vibration monitoring device 13, 23 is arranged and connected at a location relative to the loudspeaker in such a manner that they can be configured to monitor vibration caused by a sound emitted by the loudspeaker.

It is conceivable that, by mechanically connecting the vibration monitoring device to the loudspeaker, including a rigid connection, the vibration caused by the sound emitted by the loudspeaker can be coupled from the loudspeaker to the vibration monitoring device by mechanical coupling for monitoring thereby.

In an embodiment, the vibration monitoring device is indirectly connected to the loudspeaker. For example, the sound emitted by the loudspeaker may cause vibration of a component mechanically coupled to the loudspeaker, and in this case, the vibration monitoring device may monitor the vibration of such a component. For example, as shown in FIGS. 1 and 2, the vibration monitoring device 13, 23 and the loudspeaker 11, 21 are arranged on the housing 15, 25 at the same time. When the loudspeaker 11, 21 emits a sound, vibration of the housing 15, 25 is caused, and the vibration monitoring device 13, 23 monitors the vibration of the housing 15, 25. In one case, the vibration monitoring device includes an acceleration sensor and may monitor the vibration caused by the sound emitted by the loudspeaker.

In an embodiment, both the vibration monitoring device and the loudspeaker are arranged inside the housing, while the microphone is arranged outside the housing. Thus, the vibration monitoring device can more accurately monitor the vibration caused by the sound emitted by the loudspeaker, and the voice signal emitted from the outside of the housing, for example, by the user to the microphone, is limited due to the presence of the housing.

In an embodiment, the vibration monitoring device is closer to the loudspeaker than to the microphone in order to accurately detect the vibration caused by the sound from the loudspeaker so as to avoid being affected by the sound signal emitted by the user to the microphone.

Additionally, although the apparatus according to the present disclosure has been described with reference to the smart sound box and the conference room sound apparatus, this is not restrictive, and the apparatus may also include a karaoke device. Although the housings 15, 25 are shown in the embodiments of FIGS. 1 and 2, it is not restrictive, and it is also conceivable that no such housing is provided. For example, the vibration monitoring device is arranged directly on the loudspeaker, or the vibration monitoring device is arranged on another component connected to the loudspeaker and in the vicinity of the loudspeaker.

Figure 3:
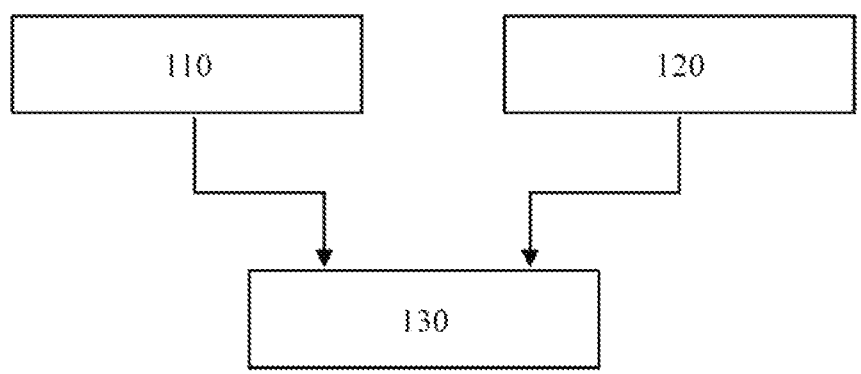
FIG. 3 illustrates a method for removing noise from a signal from a microphone according to an embodiment of the present disclosure.

FIG. 3 illustrates a method 100 for removing noise from a signal from a microphone according to an embodiment. The method 100 may be performed by the processor 14 and 24 as shown in FIG. 1 to remove the noise from the signal received by the microphone while the microphone and the loudspeaker are simultaneously operating.

According to the method 100, in step 110, a vibration signal from a vibration monitoring device 13, 23 is received, which vibration signal indicates vibration caused by a sound emitted by a loudspeaker 11, 21. In step 120, a sound signal received by the microphone 12, 22 is received. In step 130, the vibration signal is removed from the sound signal received by the microphone 12, 22 so as to remove, from the sound signal received by the microphone, noise corresponding to the sound emitted by the loudspeaker.

It may be understood that in order to make the vibration signal correspond to the sound signal from the microphone, the time delay between respective signals of the microphone and the loudspeaker may be substantially negligible, considering that the distance between the microphone and the loudspeaker is very close in the application environment, and therefore steps 110 and 120 may be performed simultaneously to obtain the vibration signal and the sound signal corresponding to each other. Of course the time delay between them may also be taken into account when the sound signal is processed on the basis of the vibration signal.

Figure 4:
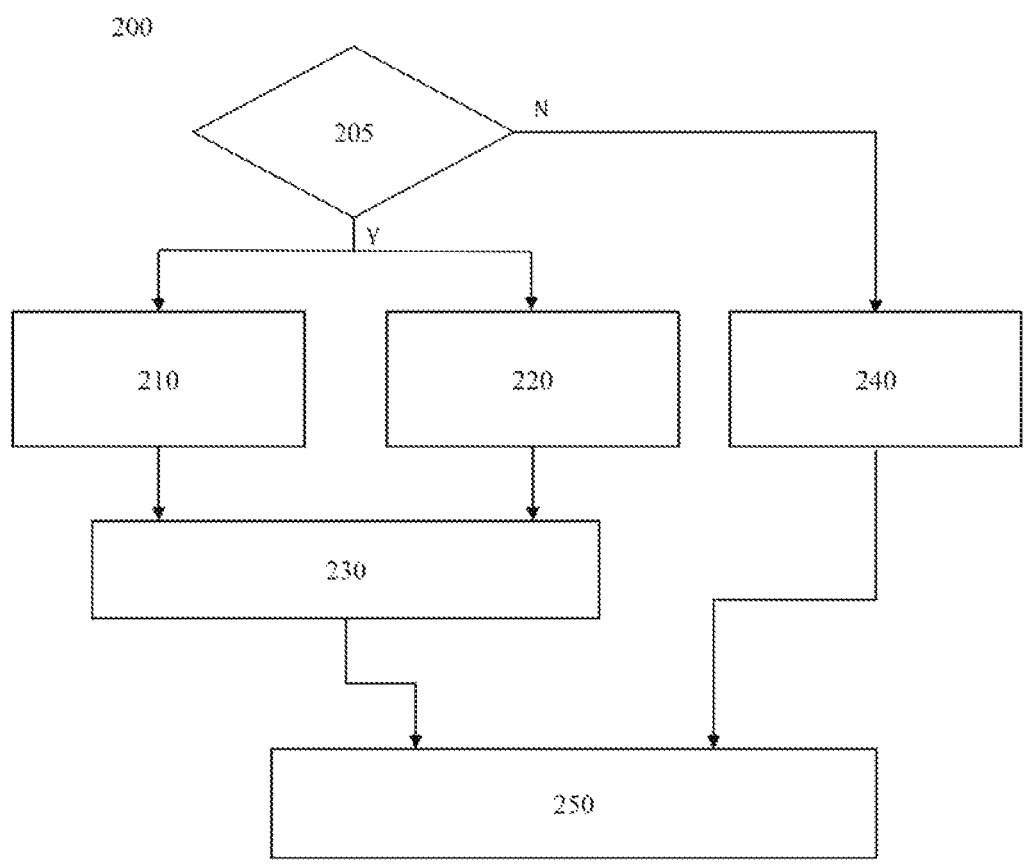
FIG. 4 illustrates a method for voice recognition according to an embodiment of the present disclosure.

FIG. 4 illustrates a method 200 for voice recognition according to an embodiment of the present disclosure. The method 200 may be performed by the smart sound box as shown in FIG. 1 to recognize the voice signal from the user.

According to the method 200 as previously described, it is first determined in step 205 whether the loudspeaker is in use. When it is determined in step 205 that the loudspeaker is not in use, the method proceeds to step 240, where only the sound signal from the microphone is received, and optionally the sound signal is processed, and then voice recognition is performed on the basis of the sound signal from the microphone in step 250. For example, when the smart sound box does not play any audio content through the loudspeaker, and the user sends a voice to the smart sound box, "What's the weather like today?", the smart sound box will directly receive the voice information and perform voice recognition on same.

When it is determined in step 205 that the loudspeaker is in use, the method proceeds to steps 210 and 220, where both the sound signal from the microphone and the vibration signal from the vibration monitoring device are received, and the sound signal is processed on the basis of the received vibration signal in step 230 to remove noise generated by the sound emitted by the loudspeaker from the sound signal. The operation of steps 210-230 is similar to the steps of the method described with reference to FIG. 3.

Next, in step 250, voice recognition is performed on the basis of the processed sound signal, whereby the smart sound box can obtain an accurate voice command from the user.

Although not shown in FIGS. 3 and 4, it may also be expected that first the vibration signal is processed such that same is converted into the corresponding sound signal, and then the sound signal from the microphone is processed on the basis of the converted sound signal. For example, the amplitude and phase of the vibration signal can be adjusted with reference to the amplitude and phase of the sound signal from the microphone to obtain the amplitude and phase of the corresponding sound signal, and then the adjusted vibration signal is removed from the sound signal received by the microphone, thereby removing noise in the sound signal.

The embodiments of the method and apparatus of the present disclosure have been described above with reference to FIGS. 1-4, and these embodiments can be combined with each other to achieve different effects regardless of the subject matter type. Furthermore, the various units/steps/processing mentioned above are not restrictive, and the functions thereof may be incorporated/combined/changed/modified to obtain corresponding effects.

In the present disclosure, the functions of the units of the apparatus for removing noise from the signal received by the microphone may be implemented by software or corresponding hardware, or by means of a processor. For example, the processor may read computer programs in a memory and run these computer programs to implement the functions of the above units. In an embodiment, the apparatus of the present disclosure may also be implemented by a memory and a processor.

In an embodiment, the functions of the apparatus may be implemented in a processor of a mobile device, or at a remote location relative to the mobile device.

It may be understood that the method and apparatus according to the embodiments of the present disclosure may be implemented by computer programs/software. Such software may be loaded into a working memory of a microprocessor and configured to execute, when being run, the method according to the embodiments of the present disclosure.

The exemplary embodiments of the present disclosure cover both of the following: computer programs/software of the present disclosure created/used from the very beginning, and available programs/software that have been converted for use as the computer programs/software of the present disclosure by means of updating.

According to another embodiment of the present disclosure, a computer program product, for example, a machine (such as a computer)-readable medium, such as a CD-ROM, is provided, where computer program code is included, and the computer program code, when executed, enables a computer or a processor to perform the method according to the embodiments of the present disclosure. The machine-readable medium is, for example, an optical storage medium or a solid-state medium supplied with other hardware or as part of other hardware.

The computer programs for performing the method according to the embodiments of the present disclosure may alternatively be published in another form, for example, via the Internet or other wired or wireless telecommunication systems.

The computer programs may alternatively be provided on a network such as the World Wide Web, and can be downloaded from such a network to a working computer of a microprocessor.

It must be pointed out that the embodiments of the present disclosure are described with reference to different subject matters. In particular, some embodiments are described with reference to method-type claims, while other embodiments are described with reference to device-type claims. However, those skilled in the art will learn from the above and following descriptions that, unless otherwise specified, in addition to any combination of features belonging to one type of subject matter, any combination of features related to different subject matters is also deemed to be disclosed by the present application. Moreover, all the features can be combined to provide a synergistic effect that is greater than the simple addition of the features.

Specific embodiments of the present disclosure have been described above. Other embodiments are within the scope of the appended claims. In some cases, actions or steps described in the claims may be performed in an order different from that in the embodiments and desired results can still be achieved. In addition, the processes described in the accompanying drawings do not necessarily require the specific order or sequential order shown to achieve the desired results. In some embodiments, multitasking and parallel processing are also possible or may be advantageous.

The present disclosure is described above with reference to specific embodiments. Those skilled in the art should understand that the technical solutions of the present disclosure can be implemented in various ways without departing from the spirit and basic features of the present disclosure. Specific embodiments are only schematic rather than limiting. In addition, these embodiments can be combined arbitrarily to achieve the purpose of the present disclosure. The scope of protection of the present disclosure is defined by the appended claims.

The word "include/comprise" in the specification and the claims does not exclude the existence of other elements or steps, and the presentation of various "steps" and the order of the various steps shown in the drawings limit neither the sequence nor the number thereof. The functions of the elements recorded in this specification or in the claims may alternatively be divided or combined, and implemented by a plurality of corresponding elements or a single element.

What is claimed is:

1. An apparatus for sound collection and playback, comprising:
 a loudspeaker;
 a microphone configured to receive a sound signal;
 a vibration monitoring device, mechanically connected to the loudspeaker and being configured to generate a vibration signal indicating vibration caused by a sound emitted by the loudspeaker; and
 a processor configured remove noise from the sound signal by:
  receiving the vibration signal;
  receiving the sound signal; and
  removing the vibration signal from the sound signal so as to remove noise from the sound signal,
 wherein the apparatus is a smart sound box or a smart television, and the processor is further configured to perform voice recognition on the basis of the noise-removed sound signal.

2. The apparatus according to claim 1, wherein the processor is further configured to adjust an amplitude, phase, and/or bandwidth of the vibration signal.

3. The apparatus according to claim 1, wherein the vibration monitoring device is configured to monitor vibration coupled from the loudspeaker to the vibration monitoring device by way of mechanical vibration coupling.

4. The apparatus according to claim 1, wherein the vibration monitoring device comprises an acceleration sensor.

5. The apparatus according to claim 1, wherein a distance between the vibration monitoring device and the microphone is greater than another distance between the vibration monitoring device and the loudspeaker.

* * * * *